United States Patent [19]
Kobayashi

[11] Patent Number: 5,206,114
[45] Date of Patent: Apr. 27, 1993

[54] INFORMATION STORAGE MEDIUM CONTAINING A RECORDING LAYER CAPABLE OF EXHIBITING A DUAL PHASE STATE

[75] Inventor: Tadashi Kobayashi, Chiba, Japan

[73] Assignee: Kabushiki Kaisha Toshiba, Kawasaki, Japan

[21] Appl. No.: 619,080

[22] Filed: Nov. 28, 1990

[30] Foreign Application Priority Data

Nov. 30, 1989 [JP] Japan ................................ 1-311353

[51] Int. Cl.$^5$ ............................ G03C 1/72; G11B 7/24
[52] U.S. Cl. ................................... 430/270; 430/271; 430/272; 430/273; 430/275; 430/290; 430/495; 430/945; 346/135.1
[58] Field of Search ............... 430/495, 945, 270, 19, 430/346, 271, 272, 273, 275, 277, 278, 279, 290; 346/135.1

[56] References Cited

U.S. PATENT DOCUMENTS

| | | | |
|---|---|---|---|
| 3,530,441 | 9/1970 | Ovshinsky | 340/173 |
| 3,716,844 | 2/1973 | Brodsky | 346/76 L |
| 4,647,944 | 3/1987 | Gravesteijn et al. | 346/1.1 |
| 4,743,526 | 5/1988 | Ando et al. | 430/270 |
| 4,773,059 | 9/1988 | Minemura et al. | 369/100 |
| 4,889,746 | 12/1989 | Utsumi et al. | 427/162 |

FOREIGN PATENT DOCUMENTS

| | | | |
|---|---|---|---|
| 0184452 | 6/1986 | European Pat. Off. | |
| 0234588 | 9/1987 | European Pat. Off. | |
| 0286406 | 10/1988 | European Pat. Off. | 430/945 |
| 0307750 | 3/1989 | European Pat. Off. | 430/945 |
| 0319037 | 6/1989 | European Pat. Off. | 430/945 |
| 3155439 | 6/1988 | Japan | 430/945 |

OTHER PUBLICATIONS

Yamada et al, *High Speed Overwritable Phase Change Optical Disk Material* Japanese Journal of Applied Physics, vol. 26 (1987) Supplement 26-4.

*Primary Examiner*—Lee C. Wright
*Attorney, Agent, or Firm*—Foley & Lardner

[57] ABSTRACT

An information storage medium includes a substrate and a recording layer in which a portion irradiated with a light beam is subjected to a phase transformation between different phases. Upon radiation of a light beam having specific conditions, the recording layer exhibits a state in which both an amorphous phase and a non-equilibrium crystalline phase are present. This state corresponds to a recorded or erased state.

20 Claims, 5 Drawing Sheets

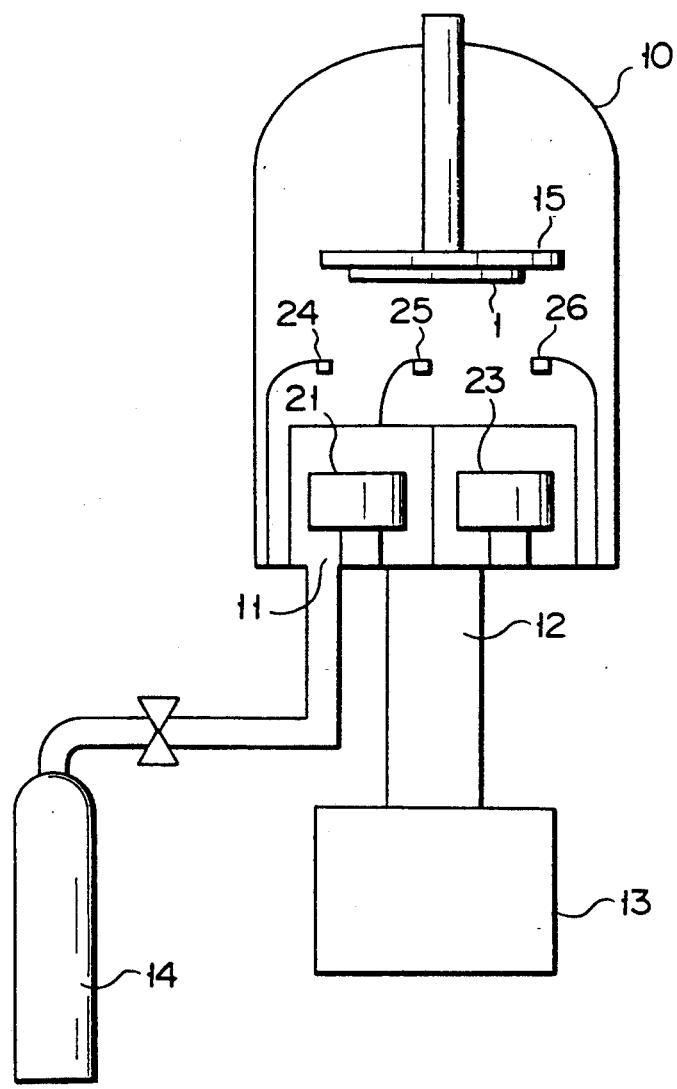
F I G. 3
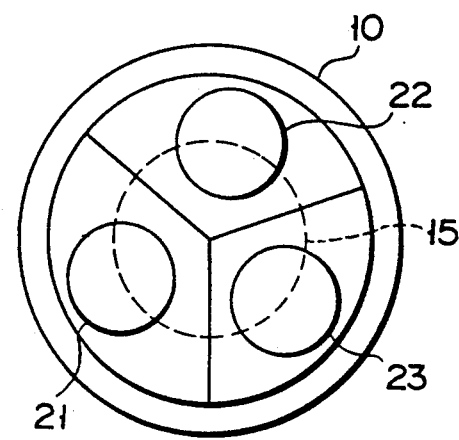
F I G. 4

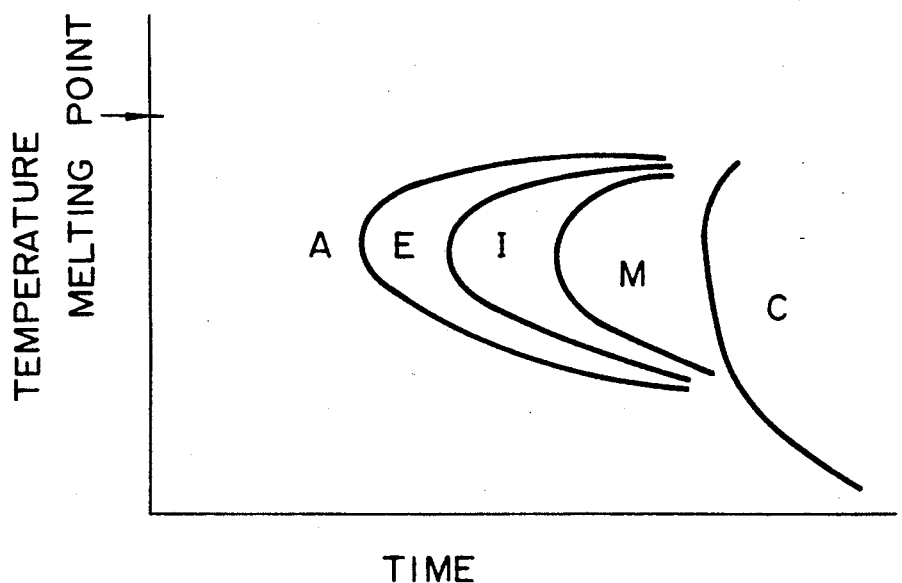
F I G. 8
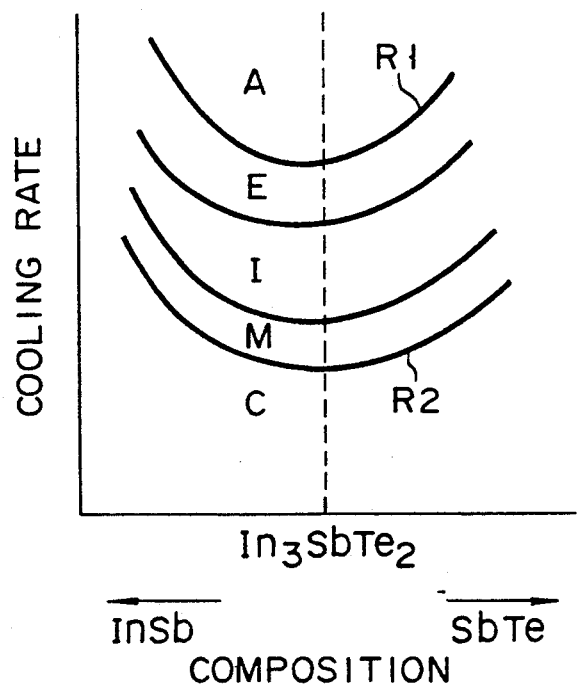
F I G. 9

INFORMATION STORAGE MEDIUM CONTAINING A RECORDING LAYER CAPABLE OF EXHIBITING A DUAL PHASE STATE

BACKGROUND OF THE INVENTION

1. Field of the Invention

The present invention relates to an information storage medium and a method of recording and erasing information in and from the information storage medium, wherein information is recorded/erased by inducing a phase change in a portion irradiated with a light beam such as a laser beam, and the information is reproduced by detecting a change in optical characteristic such as reflectivity or transmittance upon this phase change. Information storage media used in such a method are, e.g., an optical disk, an optical card, an optical tape, and optical drum.

2. Description of the Related Art

A phase-transformation type information storage medium is well known as an information storage medium capable of erasing information such as a so-called erasable optical disk. This phase-transformation type information storage medium includes a substrate made of, e.g., glass or a plastic material (a polycarbonate resin, a polymethylmethacrylate resin, or the like), and a recording layer formed on the substrate. As materials for this recording layer, chalcogenide alloys such as GeTe are known. When light beams having different conditions (e.g., a laser beam) are radiated on these materials, these materials are reversibly transformed between two phases, e.g., crystalline and amorphous phases. Information can be recorded and erased by using these phase transformations, and can be read by using changes in optical characteristics such as reflectivity and transmittance upon these phase transformation.

Materials which are suitable for such a recording layer are materials having eutectic compositions in which phase transformations are easily caused by radiating light beams, or materials for intermetallic compounds.

A conventional method of recording and erasing information by using a phase transformation between crystalline and amorphous phases, which method has been applied to phase-transformation type information storage media, cannot satisfactorily ensure the characteristics of an information storage medium. Especially, a strong demand has arisen for a method of recording and erasing information at a higher speed and allowing a single-beam overwrite operation.

SUMMARY OF THE INVENTION

The present invention has been made in consideration of the above situation, and has as its object to provide an information storage medium and a method of recording and erasing information, wherein recording and erasing operations can be performed at high speed.

It is another object of the present invention to provide a practical overwrite method.

According to an aspect of the present invention, there is provided an information storage medium comprising a substrate, and a recording layer in which a portion irradiated with a light beam is subjected to a phase transformation between different phases, wherein upon radiation of a light beam having specific conditions, the recording layer exhibits a state in which both an amorphous portion and a non-equilibrium crystal are present, and the state corresponds to a recorded or erased state.

According to another aspect of the present invention, there is provided an overwrite method comprising the steps of recording first information in an information storage medium having a recording layer in which a portion irradiated with a light beam is subjected to a phase transformation between different phases by radiating first light beam on the medium to cause a phase transformation in the beam irradiated portion of the recording layer, thereby forming a recorded portion; and overwriting second information in the medium while erasing the first information by radiating second light beam which is power-modulated between an erasing power level at which the recorded portion is subjected to a phase transformation to form an erased portion and a recording power level radiated in accordance with the second information, at which a new recorded portion is formed, wherein the recorded portion or the erased portion exhibits a state wherein both an amorphous phase and a non-equilibrium crystalline phase are present.

According to still another aspect of the present invention, there is provided a method of recording/erasing information in/from an information recording medium having a recording layer subjected to a phase transformation to one of three phases including an amorphous first phase, an equilibrium crystalline second phase, a non-equilibrium crystalline third phase in accordance with a cooling rate of a heated portion of the information recording medium, comprising the steps of: heating the recording layer and cooling the heated portion of the recording layer at a cooling rate falling between a first critical cooling rate as a boundary between a cooling rate for forming the first phase and a cooling rate for forming the third phase and a second critical cooling rate as a boundary between a cooling rate for forming the second phase and a cooling rate for forming the third phase, thereby recording information; and heating the recorded portion and cooling the heated portion of the recording layer at a cooling rate of not less than the first critical cooling rate or not more than the second critical cooling rate.

In this case, the recording cooling rate may be the first critical cooling rate or more or the second critical cooling rate or less, and the erasing cooling rate may fall between the first and second critical cooling rates.

According to the present invention, information is recorded or erased by forming a coexisting state of amorphous and non-equilibrium crystalline phases in a portion of the recording layer on which a light beam is radiated. Since crystallization of an amorphous phase includes generation of crystal nuclei and growth of crystals, the crystallization rate is increased with an increase in frequency of generation of nuclei. Depending on a material for the recording layer, an amorphous phase or a non-equilibrium crystalline phase appears by adjusting the degree of quick cooling upon radiation of a light beam. A boundary region of these phases, exhibits a state in which both amorphous and non-equilibrium crystalline phases exist. Therefore, by getting a state in which non-equilibrium crystalline phase is present in an amorphous phase, crystals can be grown by using non-equilibrium crystals as nuclei, and high-speed crystallization can be performed. Therefore, recording and erasing operations can be performed at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention

FIG. 3 is a longitudinal sectional view showing a schematic arrangement of an apparatus for forming a recording layer;

FIG. 4 is a cross-sectional view of the apparatus;

FIG. 8 is a graph showing a relationship between cooling time, temperatures, and the resultant phases when an In-Sb-Te recording layer is heated; and FIG. 9 is a graph showing a relationship between cooling rates, compositions, and the resultant phases when the In-Sb-Te recording layer is heated

DETAILED DESCRIPTION OF THE PREFERRED EMBODIMENTS

Figure 1:
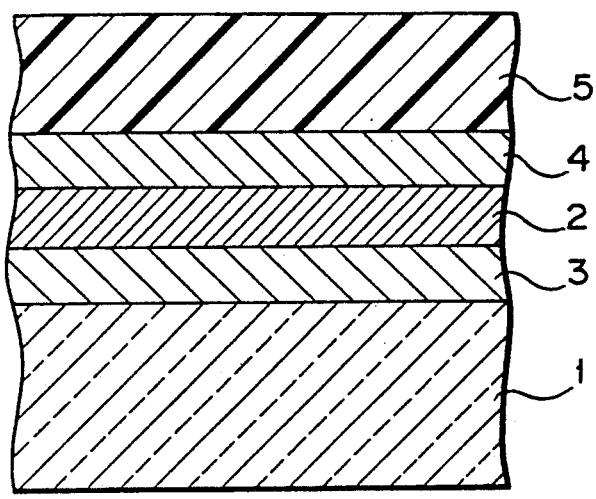
FIGS. 1 and 2 are sectional views showing information storage media according to embodiments of the present invention.

The present invention will be described in detail below with reference to the accompanying drawings. FIG. 1 is a sectional view showing an information storage medium to which the present invention is applied A substrate 1 is made of one of the materials normally used in this technical field, e.g., a plastic material such as polyolefin, epoxy, polycarbonate (PC), or polymethylmethacrylate (PMMA), or glass. A protective layer 3, a recording layer 2, and protective layers 4 and 5 are formed on the substrate 1 in the order named.

The protective layers 3 and 4 are arranged to sandwich the recording layer 2, and are made of a high polymeric organic material, for example, a thermosetting resin such as PMMA or polystyrene, an ultraviolet-curing resin (so-called 2P resin), or a dielectric material such as $SiO_2$, $Al_2O_3$, AlN, ZnS, or $ZrO_2$. These protective layers 3 and 4 have the following functions: preventing the recording layer 2 from being influenced by moisture in air; preventing a light beam such as a laser beam from evaporating an irradiated portion of the recording layer 2 or forming holes in the recording layer 2 during a recording/erasing operation; and controlling the temperature of the recording layer 2. These protective layers 3 and 4 can be properly formed by spin coating, vapor deposition, or sputtering. Note that each protective layer 3 or 4 preferably has a thicknesses of 10 Å to 100 μm.

The protective layer 5 is formed to prevent a surface of the information storage medium from being damaged or to prevent adhesion of dust thereto. The protective layer 5 is formed by coating an ultraviolet-curing resin by, for example, spin coating and curing it upon radiation of ultraviolet rays. The protective layer 5 preferably has a thickness of 100 Å to 1,000 μm. Although the protective layers 3, 4, and 5 are preferably formed, they need not always be formed.

Figure 2:
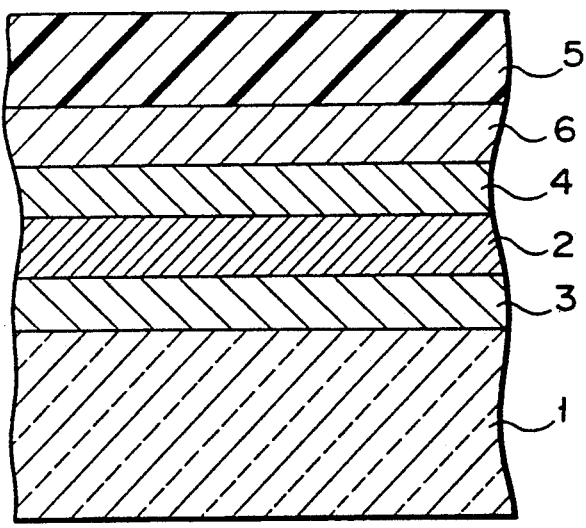

As shown in FIG. 2, a reflecting layer 6 may be formed between the protective layers 4 and 5. The reflecting layer 6 serves to reflect a reproducing light beam to increase a reproducing signal in level by multiple interference, and to facilitate an overwrite operation (to be described later) by rapidly cooling the recording layer 2 during a recording/erasing operation. The reflecting layer 6 may be made of a metal such as Au, Al, Cu, Cr, or Ti, or an alloy such as Ni-Cr or Cu-Al. In order to perform the above-described functions, the reflecting layer 6 preferably has a thickness of 10 Å to 3,000 Å.

The recording layer 2 is made of a material which can exhibit a state in which both amorphous and non-equilibrium phases are present upon radiation of a light beam. In this case, a non-equilibrium phase is a phase which does not exist in an equilibrium state such as a metastable phase, a high-temperature phase, or a high-pressure phase. In such a state in which both amorphous and non-equilibrium phases are present, an amorphous component is very quickly crystallized as a non-equilibrium crystal serves as a nucleus. Therefore, recording and erasing operations can be increased in speed. As a material exhibiting such a phase change, In-Sb-Te, Ge-Sb-Te, Au-Sb-Te, Ag-Sb-Te, or the like is available.

Assume that the recording layer 2 is made of In-Sb-Te. In this case, when the recording layer 2 is melted upon radiation of a light beam and is quickly cooled, the layer 2 exhibits an amorphous phase, or a three-element compound $In_3SbTe_2$ appears as a non-equilibrium crystalline phase depending on the conditions of the quick cooling operation. Therefore, in a boundary region of amorphous phase and non-equilibrium phase, both the amorphous and non-equilibrium phases are present. Essentially, the In-Sb-Te alloy has a high crystallization rate. In addition, an amorphous phase in this alloy is crystallized with a non-equilibrium crystal phase serving as a nucleus. Therefore, if this alloy is used as a recording layer, initialization and recording and erasing operations can be increased in speed.

This will be described in detail with reference to FIGS. 8 and 9. FIG. 8 is a graph showing a relationship between cooling time, temperatures, and the resultant phases when a recording layer is heated, and FIG. 9 is a graph showing a relationship between cooling rates, compositions, and the resultant phases when the recording layer is heated. Reference symbol A in each of FIGS. 8 and 9 denotes an amorphous phase; I, a non-equilibrium crystalline (i.e., an intermetallic compound of $In_3SbTe_2$) phase; C, an equilibrium crystalline (a mixture of InSb, Sb, and SbTe) phase; E, a mixing state of A and I; and M, a mixing state of I and C.

As shown in FIG. 8, when a recording layer is cooled from a temperature higher than its melting point, the amorphous phase A appears at a high cooling rate, but the equilibrium crystalline phase C appears at a low cooling rate. When the recording layer is cooled between these cooling rates, the non-equilibrium crystalline phase represented by E, I, and M appears. More specifically, as shown in FIG. 9, when the recording layer having a composition similar to $In_3SbTe_2$ is cooled at a cooling rate falling between a first critical cooling rate $R_1$ and a second critical cooling rate $R_2$, a phase including a non-equilibrium crystalline phase appears. This indicates that various phases can be formed in In-Sb-Te alloys by simply changing cooling rates, and at the same time the non-equilibrium crystalline phase can be obtained. The phase E as a mixing state of the amorphous and non-equilibrium crystalline phases is caused to correspond to a recording state, and the phase A or C is set in an erasing state. Alternatively, the phase E is caused to correspond to the erasing state, and the phase A or C is set in an recording state. Therefore, the erasing and recording operations can be increased in speed, as described above.

The phase I or M including the non-equilibrium crystalline phase except for E is caused to correspond to the recording or erasing state, and a phase transformation between the above phase and the amorphous or equilibrium crystalline phase can be easier than that in a conventional method utilizing a phase transformation between the phases A and C and is preferable.

The cooling rate can be adjusted by adjusting a layer structure of the information recording medium or by changing a power or pulse width of a heating light beam.

The phase states shown in FIGS. 8 and 9 can be similarly obtained by other materials such as Ge-Sb-Te as described above.

The recording layer 2 can be properly formed by vapor deposition, sputtering, or the like. When vapor deposition or sputtering is to be performed by using an alloy target, some consideration must be taken to a difference between a target composition and the composition of an actually formed film. In addition, the recording layer 2 can be formed by multi-element co-deposition or multi-element co-sputtering. The recording layer 2 preferably has a thickness of 10 to 3,000 Å.

A method of forming a recording layer of an information storage medium according to this embodiment will be described below with reference to FIGS. 3 and 4. FIG. 3 is a longitudinal sectional view showing a schematic arrangement of a sputtering apparatus used to form a recording layer of this embodiment. FIG. 4 is a cross-sectional view of the apparatus. Referring to FIGS. 3 and 4, reference numeral 10 denotes a vacuum vessel. The vacuum vessel 10 has a gas inlet port 11 and a gas outlet port 12 in its bottom surface. The gas outlet port 12 is connected to an evacuating unit 13. The vacuum vessel 10 is evacuated by this evacuating unit 13 through the outlet port 13. In addition, the gas inlet port 11 is connected to an argon gas cylinder 14. An argon gas as a sputtering gas from this cylinder is introduced into the vacuum vessel 10 through the gas inlet port 11. A disc-like rotating base 15 for supporting a substrate is arranged at an upper portion in the vacuum vessel 10 while its surface is kept horizontal. The substrate 1 is supported on the lower surface of the rotating base 15. The base 15 is rotated by a motor (not shown). Targets 21, 22, and 23 respectively made of elements constituting a recording layer are arranged near the bottom portion in the vacuum vessel 10 so as to oppose the base 15. A high-frequency power supply (not shown) is connected to each target. When the recording layer 2 is to be formed by an In-Sb-Te three-element alloy, the targets 21, 22, and 23 are respectively made of In, Sb, and Te.

Monitor units 24, 25, and 26 are respectively arranged above the targets 21, 22, and 23. Sputtering amounts from the respective sputtering targets are monitored by these monitor units, and the amount of power to be supplied to each target is adjusted to allow a recording layer to have a predetermined composition.

In such a sputtering apparatus, the vacuum vessel 10 is evacuated first to, e.g., $10^{-6}$ Torr by the evacuating unit. An argon gas is then introduced into the vessel 10 through the gas inlet port 11 while the evacuation amount of the evacuating unit 13 is adjusted to keep an argon gas atmosphere in the vacuum chamber at a predetermined pressure. In this state, predetermined power is applied to each of the targets 21 and 22 for a predetermined period of time while the substrate 1 is rotated. With this operation, a recording layer having a predetermined composition can be formed on the substrate 1. Note that protective layers can be formed in the following manner. Prior to the formation of the recording layer 2, the protective layer 3 is formed on the substrate 1 by sputtering using a target adjusted for the composition of the protective layer. Thereafter, the recording layer 2 is formed, and the protective layer 4 can be formed on the recording layer 2 under the same conditions as those for the formation of the protective layer 3. When the reflecting layer 6 is to be formed, sputtering is performed in the same manner as described above by using a target consisting of the same material as that of the reflecting layer 6.

Initialization and recording, erasing, and reproducing operations of the information storage medium of the present invention will be described below.

INITIALIZATION

The recording layer 2 is normally amorphous in the state of as-deposited. In order to record information, the recording layer 2 must be crystallized. Therefore, the recording layer 2 is crystallized by radiating a light beam such as a laser beam on the entire surface of the recording layer 2 so as to heat it and gradually cool it.

RECORDING OPERATION

A high-output light beam having a small pulse width is radiated on the recording layer so as to heat the irradiated portion and quickly cool it. With this operation, a phase transformation is caused in the beam irradiated portion in such a manner a non-equilibrium crystalline phase is changed to a mixed phase in which both non-equilibrium crystalline and amorphous phases are present. As a result, a recorded mark is formed. In this case, the light beam is radiated to realize a state in which both amorphous and non-equilibrium crystalline phases are present. Note that in this mixed state, non-equilibrium crystalline portions may be dispersed in an amorphous phase, or an amorphous phase and a non-equilibrium crystalline phase may be stacked on each other.

ERASING OPERATION

The recorded mark portion formed on the recording layer 2 is irradiated with a light beam having a lower output and a larger pulse width than the light beam used for the recording operation, thus changing the phase of the recorded mark portion into a crystalline phase. As a result, the information is erased.

REPRODUCING OPERATION

A relatively weak light beam is radiated on the recording layer 2, in which information is recorded, so as to detect a difference in optical characteristics, e.g., reflectivity, between the recorded mark portion and non-recorded portion, thus reading the information.

Figure 5:
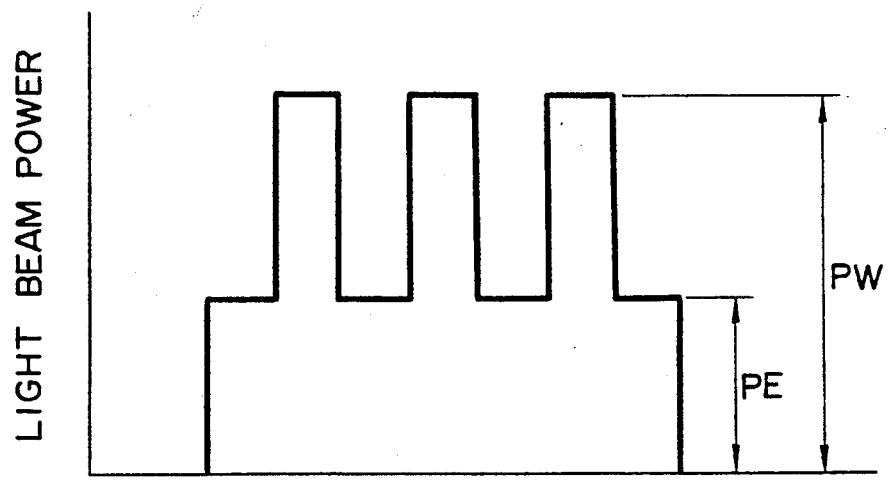
FIG. 5 is a graph showing the waveform of a light beam used in an overwrite operation.

A method of recording and erasing information according to the present invention can be applied to a single-beam overwrite operation. A single-beam overwrite operation is an operation in which a laser beam emitted from a single light source is power-modulated between an erasing level $P_E$ and a recording level $P_W$, as shown in FIG. 5, a pulse of the recording power level is superposed on a laser beam of the erasing power level, and new information is overwritten while already recorded information is erased. More specifically, a laser beam having the recording level $P_W$ is radiated on a portion of the recording layer in which new information is to be recorded, and a laser beam having the erasing level $P_E$ is radiated on other portions. In the portion irradiated with the laser beam having the recording level $P_W$, a recorded mark constituted by a mixed phase in which both non-equilibrium crystalline and amorphous phases are present. On the other hand, since the laser beam having the erasing level $P_E$ is radiated on a previous recorded mark portion, the phase of this portion is transformed into a crystalline phase, and the information is erased.

In such a single-beam overwrite operation, since recording and erasing operations are performed by only power modulation of a light beam, high-speed recording and erasing operations are required.

The above-described phase transformation between an amorphous phase and a non-equilibrium phase occurs at very high speed, and hence is suitable for an overwrite operation.

A single-beam overwrite operation can be further facilitated by using the medium having the same layer structure as shown in FIG. 2 while the protective layers 4 and 5 have heat insulating functions, and the reflecting layer 6 has a quickly cooling function. More specifically, the insulating functions of the protective layers facilitate an erasing operation, and the quickly cooling function of the reflecting layer serves to reliably cause a phase change to an amorphous phase, thereby facilitating a single-beam overwrite operation.

Note that a currently available semiconductor layer is properly used as a light source for a light beam used in the present invention. However, the present invention is not limited to a semiconductor laser, but other light sources may be used. In terms of a recording density, a light beam having a shorter wavelength is preferable because the radiation spot can be reduced in size. More specifically, a spot radius Wo of a light beam can be defined by a radial distance from the optical axis at which the intensity of the light becomes $e^{-2}$ follows:

$$Wo = 0.41 \frac{\lambda}{NA}$$

where $\lambda$: the wavelength of an incident light; and NA: the numerical aperture of a focusing lens That is, the spot size can be reduced with a decrease in wavelength of light. Therefore, a red or blue light beam having a shorter wavelength than that of a semiconductor laser, 830 nm (infrared range), is preferably used. Theoretically, the wavelength of a light beam to be used has no lower limit. However, the lower limit of the wavelength is determined based on whether the light beam can cause a phase change and can reproduce information. A light beam having a wavelength of at least 400 nm can be used. If a light beam having a wavelength of about 400 nm is used, a recording density four times higher than a recording density obtained when a semiconductor laser having a wavelength of 830 nm is used can be obtained.

In addition, the above-described phase change can be also applied to a multi-value recording operation. A multi-value recording operation is described in a copending application (U.S. Ser. No. 372,464; Filed Data: Jun. 28, 1981) filed by the present inventor.

A multi-value recording operation is performed as follows. Information to be recorded is converted into a signal having three or more levels by using a proper unit. An information storage medium is then irradiated with a light beam which is converted into a light beam having a plurality of energy levels in accordance with this signal. With this radiation, an irradiated portion of a recording layer is changed between a plurality of states so as to record multi-level information in the medium.

The radiation energy of a light beam can be changed among plural levels by changing either or both of the power and pulse width of the light beam. In order to perform a multi-value recording operation by setting a recording state in a mixed phase in which both amorphous phase and non-equilibrium crystalline phase are present, the power or pulse width of a light beam is changed among plural levels within the range in which a mixed phase appears, and the light beam is radiated on a recording layer. In this case, if the energy of the light beam is increased, the ratio of amorphous portions to a recorded mark is increased. If the energy is decreased, the ratio of non-equilibrium crystals to the recorded mark is increased.

With different crystallinities as in the above-described case, the reflectivity varies. By detecting this difference in reflectivity, the multi-value information can be reproduced.

Note that the recording spot is increased with an increase in energy of a light beam. Since the spot size of a reproducing light beam is constant, if the energy of a recording light beams is changed, the ratio of a recorded mark to the reproducing light beam spot is changed. As a result, the reflectivity is changed. Therefore, a large C/N ratio can be obtained from a combination of the above-mentioned reflectivity change upon a change in crystallinity and the reflectivity change upon a change in recording spot size.

Figure 6:
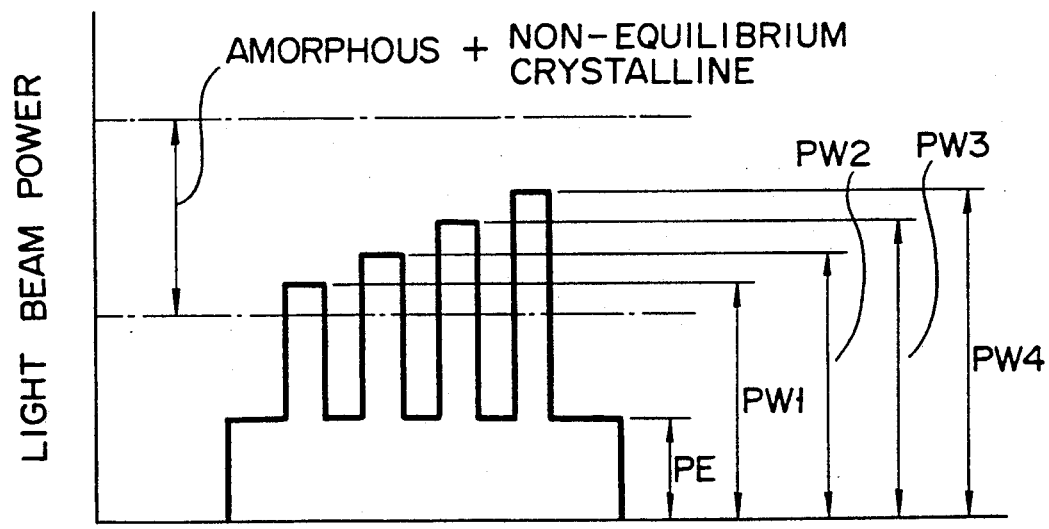
FIG. 6 is a graph showing the waveform of a light beam used in a multi-level overwrite operation.

Such a multi-value recording operation can be applied to an overwrite operation in the following manner. As shown in FIG. 6, pulsed light having power levels $P_{W1}$ to $P_{W4}$, which is used to form both amorphous and non-equilibrium crystalline portions, is superposed on continuous light having the erasing power level $P_E$. The resultant beam is then radiated on a recording layer. With this operation, multi-value recording of new information can be performed while previously recorded information is erased.

EXAMPLE

Figure 7:
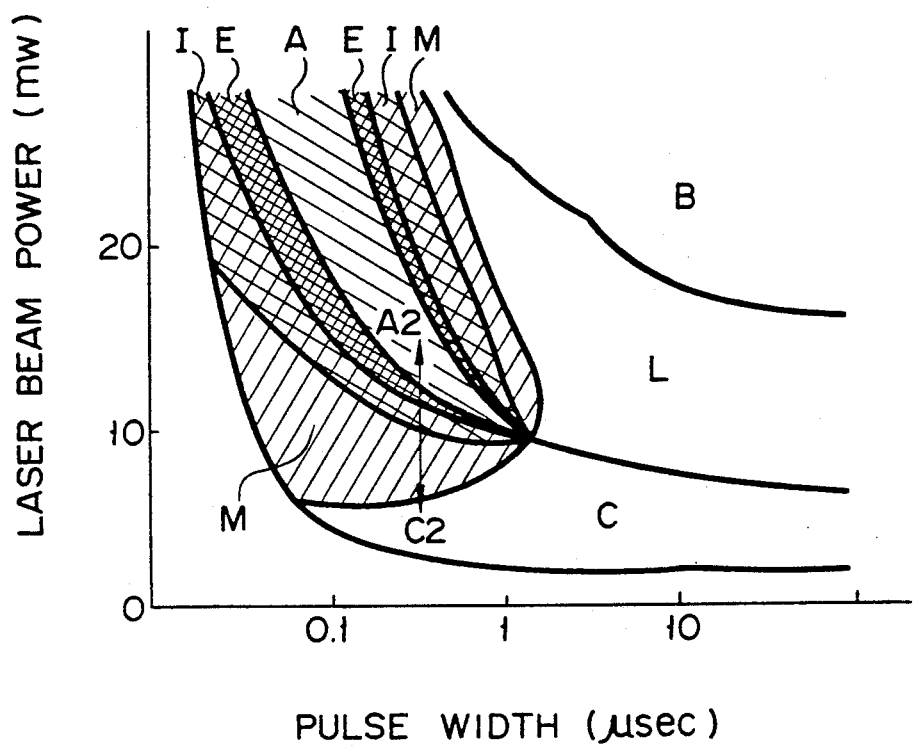
FIG. 7 is a graph showing a relationship between radiation conditions, which are set when a laser beam is radiated on a recording layer, and the state of an irradiated portion.

An optical disk sample having the same layer structure as that shown in FIG. 1 and having a recording layer formed of an In-Sb-Te three-element alloy was manufactured. In the equilibrium diagram of an In-Sb-Te three-element system, an $In_3SbTe_2$ three-element compound appears at a high temperature of 435° C. or more. It is reported that the composition range in which this high-temperature phase appears corresponds to a composition range defined by $In_9Te_7$, InSb, Sb, and $In_3Te_4$ (Z. Metallkde Bd. 71 (1980)H.9). In this example, the sample was manufactured to form a recording layer having a composition of $In_{33}Sb_{31}Te_{36}$ in which appears the $In_3SbTe_2$ three-element compound as a non-equilibrium crystalline phase. Semiconductor laser beams having a wavelength of 830 mn and various pulse widths were focused and radiated on the recording layer of this sample from the substrate side by using an objective lens, and the structure of the irradiated portion was checked by a transmission electron microscope (TEM). FIG. 7 shows the result. FIG. 7 is a graph showing the state of the irradiated portion, in which the pulse width of a radiation laser beam is plotted along the axis of abscissa, and the laser beam intensity is plotted along the axis of ordinate. Referring to FIG. 7, a region A is a region in which the irradiated portion became an amorphous portion, and a region C corresponds to an equilibrium crystalline phase. A region L corresponds to an equilibrium crystalline phase upon melting. A region B is a region in which a film breakdown occurred. A region I is a region in which the $In_3SbTe_2$ of a high-temperature phase (non-equilibrium crystalline phase) appeared. A region M is a region in which a mixed phase of the $In_3SbTe_2$ three-element compound and an equilibrium crystalline phase appeared. In addition, a region E is a region in which both an amorphous phase and the $In_3SbTe_2$ three-element compound existed.

In a conventional medium, recording of information is performed by utilizing a phase transformation between A2 and C2 in FIG. 7, i.e., a phase transformation between an amorphous portion and an equilibrium crystal. In contrast to this, according to the present invention, the state of the region E is considered as a recorded or erased state. In this example, a state in which both a $In_3SbTe_2$ non-equilibrium crystalline phase and an amorphous phase portion exist corresponds to a recorded or erased state. As is apparent from FIG. 6, in this example, a recording operation can be performed at a power level lower than that in the conventional method in which a recorded mark is constituted by an amorphous portion. In addition, recording and erasing operations can be performed with shorter pulses. That is, the present invention allows faster recording and erasing operations than the conventional method, and it is confirmed that the present invention is suitable for a high-speed overwrite operation.

A plurality of samples were manufactured while the material for the protective layers 3 and 4 and the thickness of the recording layer were changed. In each sample, a recorded mark portion having both an amorphous phase and an $In_3SbTe_2$ non-equilibrium crystalline phase was formed, and a sectional area thereof was observed by the TEM. As a result, it was confirmed that the coexisting state of an amorphous phase and a non-equilibrium crystalline phase varies depending on the material on the protective layers 3 and 4 and the thickness of the recording layer, i.e., these phases are mixed together in one case, and they are stacked on each other in the other case. It was confirmed that an amorphous phase and a non-equilibrium crystalline phase tended to be stacked on each other, especially when the recording layer has a large thickness, and the protective layers were made of a material having a low thermal diffusivity.

In the above-described embodiments, a recorded state is a state in which both an amorphous phase and a non-equilibrium crystalline phase exist. However, an erased state may be defined by such a state.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information storage medium comprising:
   a substrate; and
   a recording layer in which a portion irradiated with a light beam is subjected to a phase transformation between different phases,
   said recording layer exhibiting a dual phase state in which both an amorphous phase and a non-equilibrium crystalline phase comprising $In_3SbTe_2$ are present, said dual phase state corresponding to a recorded or erased state.

2. A medium according to claim 1, wherein said recording layer has a thickness of 10 to 3,000 Å.

3. A medium according to claim 1, further comprising a first protective layer formed between said substrate and said recording layer, and a second protective layer formed on said recording layer, said first and second protective layers serving to protect said recording layer and to control a temperature of said recording layer.

4. A medium according to claim 3, wherein each of said protective layers has a thickness of 10 Å to 100 μm.

5. A medium according to claim 3, wherein each of said protective layers contains an organic material or a dielectric material.

6. A medium according to claim 5, wherein said protective layer comprises an organic material selected from the group consisting of polystyrene, polymethyl methacrylate, and an ultraviolet-curing resin.

7. A medium according to claim 5, wherein said protective layer comprises a dielectric material selected from the group consisting of $SiO_2$, $Al_2O_3$, AlN, ZnS, and $ZrO_2$.

8. A medium according to claim 3, further comprising a resin layer formed on said second protective layer.

9. A medium according to claim 8, wherein said resin layer comprising an ultra-violet curing resin.

10. A medium according to claim 8, further comprising a reflecting layer formed between said second protective layer and said resin layer.

11. A medium according to claim 10, wherein said reflecting layer has a thickness of between 10 and 3000 angstroms and comprises a material selected from the group consisting of Au, Al, Cu, Cr, Ti, Ni-Cr, and Cu-Al.

12. A medium according to claim 3, further comprising a reflecting layer, formed on said second protective layer, for reflecting a reproducing light beam.

13. A medium according to claim 12, wherein said reflecting layer has a thickness of 10 Å to 3,000 Å.

14. A medium according to claim 12, wherein said reflecting layer contains a material selected from the group consisting of Au, Al, Cu, Cr, Ti, Ni-Cr, and Cu-Al.

15. A medium according to claim 1, wherein said substrate is selected from the group consisting of a polyolefin, an epoxy, a polycarbonate, polymethyl methacrylate, and glass.

16. A medium according to claim 1, wherein said phase transformation of said recording layer is performed between a crystalline state and said dual phase state, and said dual phase state corresponds to said recorded state.

17. A medium according to claim 1, wherein said dual phase comprises non-equilibrium crystalline portions dispersed in an amorphous phase.

18. A medium according to claim 1, wherein said dual phase comprises an amorphous phase and a non-equilibrium phase stacked on each other.

19. A medium according to claim 1, wherein said dual-phase state corresponds to a recorded state.

20. A medium according to claim 1, wherein said dual-phase state corresponds to an erased state.

* * * * *